May 26, 1953   R. C. RAMER   2,639,450
DOCK LOADING RAMP UNIT
Filed April 30, 1951   3 Sheets-Sheet 1
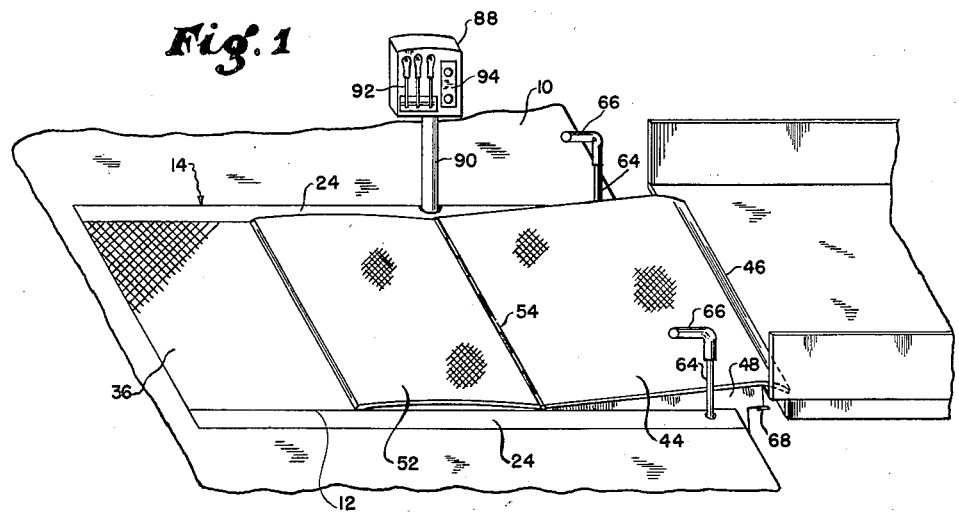
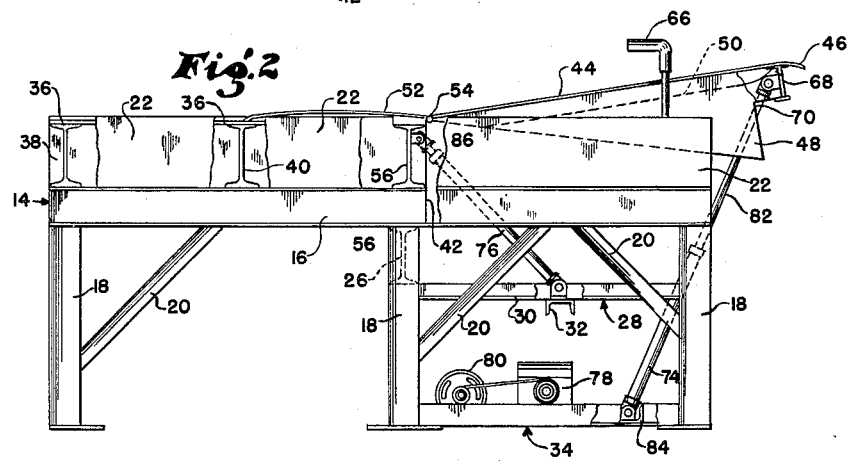
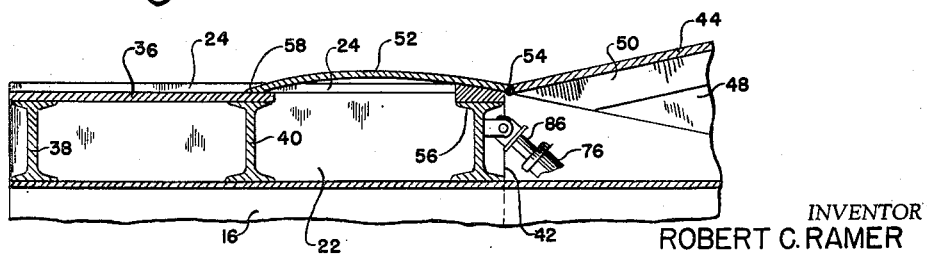
INVENTOR
ROBERT C. RAMER
BY
ATTORNEY May 26, 1953     R. C. RAMER     2,639,450
DOCK LOADING RAMP UNIT
Filed April 30, 1951     3 Sheets-Sheet 2
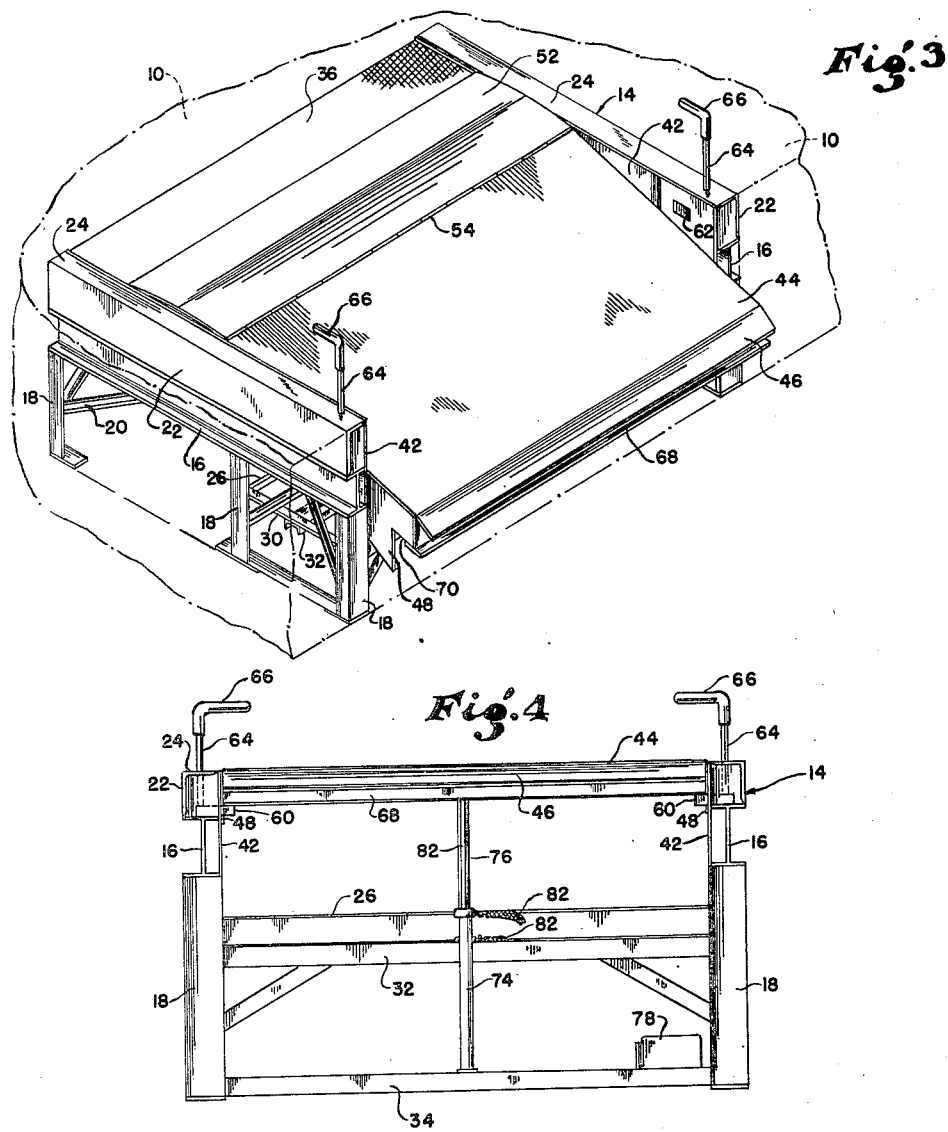
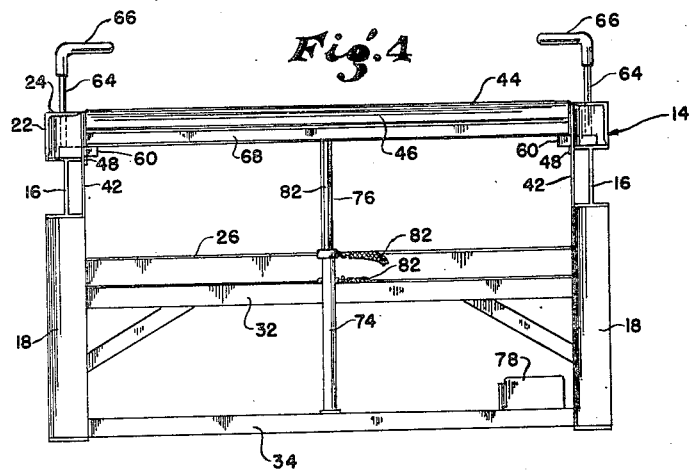
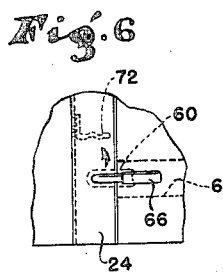 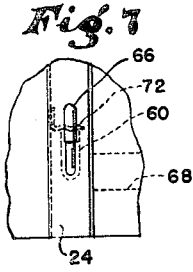
INVENTOR.
ROBERT C. RAMER
BY
ATTORNEY May 26, 1953  R. C. RAMER  2,639,450
DOCK LOADING RAMP UNIT
Filed April 30, 1951  3 Sheets-Sheet 3
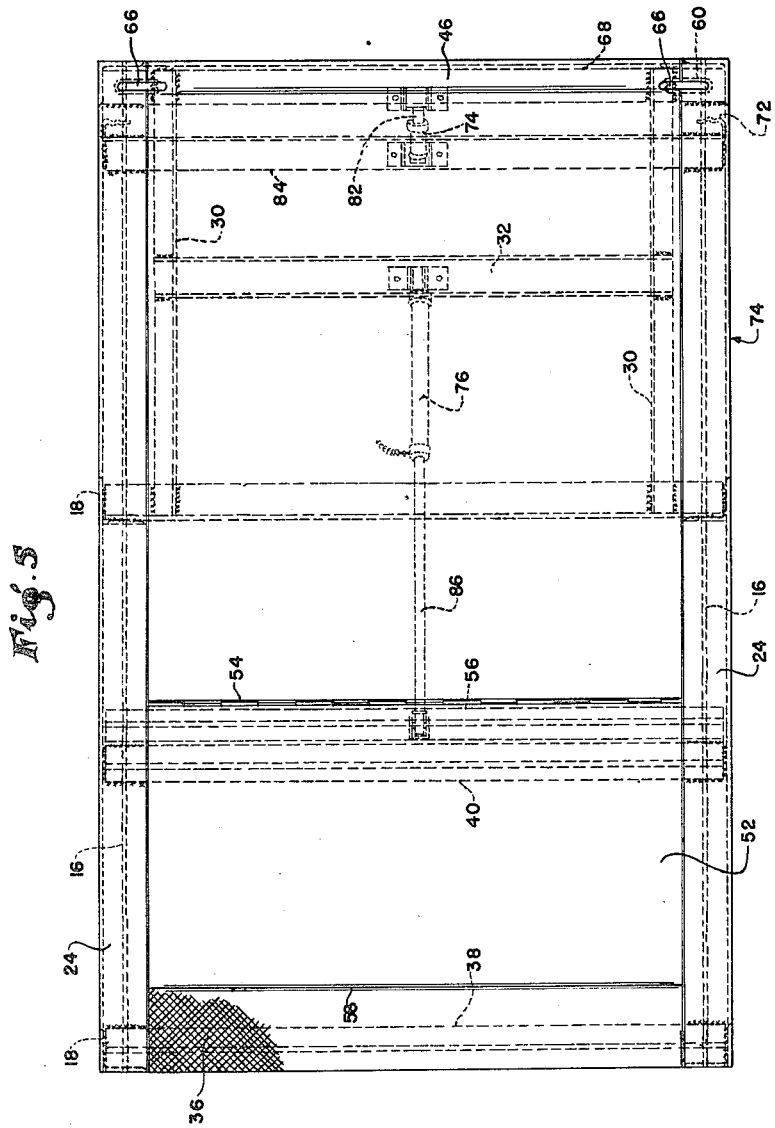
INVENTOR
ROBERT C. RAMER
BY
ATTORNEY Patented May 26, 1953

2,639,450

UNITED STATES PATENT OFFICE 2,639,450

DOCK LOADING RAMP UNIT

Robert C. Ramer, Yoe, Pa., assignor to Wm. Christensen Co., Inc., York, Pa., a corporation of Pennsylvania Application April 30, 1951, Serial No. 223,741

6 Claims. (Cl. 14—71)

This invention relates to a loading ramp assembly for docks and, more particularly, but not restricted thereto, to dock-type loading ramps for use with vehicles such as trucks, railway cars and the like, whereby a ramp is provided to extend between a loading dock and the vehicle in order that loading trucks of either the hand or power driven type may readily be wheeled from the dock onto the vehicle.

Loading ramps of various types have been used heretofore, some of these merely being substantially flat plates which are manually placed so as to span the space between the floor of the dock and the floor of a vehicle to be loaded. In order to sustain the weight imposed upon such ramps by loading trucks running thereover, it is necessary that these ramps be of relatively heavy gauge material, whereby the total weight of the ramp is appreciable. Operators, in handling such manually operated ramps, frequently injure their fingers and feet while placing the ramps in position and, also, handling such plates is arduous.

Other types of ramps presently in use include mechanically operable means for arranging a ramp plate between a dock surface and the bed or floor of a vehicle being loaded but such means are usually very limited in their range of movement and the operation thereof also generally has been cumbersome and awkward.

It is an object of the present invention to provide a power operated loading ramp assembly in which a maximum of mobility is afforded for positioning a ramp plate so as to accommodate a very wide range of heights of vehicles relative to a loading dock.

Another object of the invention is to provide in such loading ramp assembly a maximum of safety during operation as well as a minimum requirement of manual force by the operator, the operation of said assembly being effected by the manipulation of suitable valve control handles and starting switches.

It is a further object of the invention to provide a ramp plate which is movable not only in projecting and retracting directions relative to the loading edge of a dock but the outer end of the ramp plate is movable also in opposite vertical directions so as to extend said outer end of the ramp plate considerably above the level of the dock when necessary and also considerably below said dock level when conditions require the same.

It is a still further object of the invention to provide a tail or spanning plate flexibly connected at its forward end to the rear end of the ramp plate in order that any space between the dock floor and the rear end of the ramp plate will be covered effectively and automatically as when the ramp plate is projected beyond the outer edge of the dock floor.

One other object of the invention is to so arrange said tail or spanning plate so that its rearmost edge which is usually first engaged by loading trucks when rolling thereover will always be substantially within the floor plane of the dock so as not to obstruct such rolling of the loading trucks thereover.

One further object of the invention is to provide effective means to support the ramp plate in normal position flush with the dock floor and, additionally, indicating means for the supporting members visually showing the position of the supporting members.

Still another object of the invention is generally to provide a rugged, heavy-duty loading ramp assembly which may easily be installed within a suitable recess formed in a dock floor and extending backward from the outer edge thereof and, notwithstanding the rugged nature of the assembly, the various movable plates which support loading trucks during the operation thereof are entirely operable by mechanism requiring relatively little power and controlled simply by valve handles and starting switches, the ramp and other plates of the mechanism being supported during use by either the vehicle being loaded or supporting members of the assembly while the operating means normally do not afford support for said plates during loading operations.

Details of the invention and the foregoing objects thereof, as well as other objects thereof, are set forth in the following specification and illustrated in the accompanying drawings forming a part thereof.

In the drawings:

Fig. 1 is a perspective view of a preferred embodiment of a loading ramp unit incorporating principles of the invention and installed in an exemplary illustration of a dock, the ramp plate engaging a fragmentary portion of a vehicle.

Fig. 2 is a side elevation of the preferred embodiment of the invention comprising a complete loading ramp assembly such as illustrated in Fig. 1.

Fig. 3 is a perspective view of the ramp assembly shown in Figs. 1 and 2 but illustrating the outer end of the ramp plate positioned below the floor of the dock, the dock being illustrated herein in phantom by dot and dash lines.

Fig. 4 is a front end view of the loading ramp assembly illustrated in Figs. 1 through 3.

Fig. 5 is a top plan view of said loading ramp assembly shown in the foregoing figures.

Figs. 6 and 7 are fragmentary plan views of the supporting members for the outer end of the ramp plate, Fig. 6 illustrating one of the supporting members in supporting position and, in Fig. 7, the supporting member being in retracted or non-supporting position.

Fig. 8 is an enlarged fragmentary sectional view showing details of the tail or spanning plate during its operation.

Referring to the drawings, a dock 10 is provided with an opening or recess 12 in which the loading ramp unit or assembly generally designated 14 is mounted. The unit 14 may utilize any desirable type of supporting structure or frame, depending upon the limitations of the dock 10 and the operating conditions involved. In the exemplary illustration shown in the drawings, the unit 14 comprises a pair of side beams 16 which also function as guide rails for certain movable portions of the unit or assembly described hereinafter. The side beams 16 are supported by a number of vertical legs 18 which are fixed to the side beams 16 and are held rigidly by a number of braces 20. The unit is also preferably provided with side facing plates 22 which are fixed to the side beams 16 by welding or otherwise, and are somewhat in the nature of angle beams as clearly shown especially in Figs. 3 and 4.

The upper flanges 24 of the facing plates 22 are preferably positioned so as to be flush with the floor surface of the dock 10. A cross-brace 26 such as an I-beam extends between the two central legs 18 and is fixed at its ends thereto. A sub-frame, generally indicated 28, is positioned parallel to but below the side beams 16. Said sub-frame 28 comprises a pair of side members 30 which are secured at their ends to the cross-brace 26 and the front legs 18, and a cross-channel 32 extends between the side members 30 and is secured at its ends thereto by welding or otherwise. Another cross-member 34 also preferably extends between and is connected to the lower ends of the front legs 18.

Dock plate 36 is supported by a pair of cross-beams 38 and 40 which are fixed at their ends to the side beams 16. The cross-beams 38 and 40 are clearly shown in Figs. 2 and 8 and the dock plate 36 lies upon and is fixed to the upper flanges of said beams 38 and 40, said dock plate 36 preferably being substantially within the floor plane of the dock 10 but, in actual installation, said plate may be mounted slightly below said floor level of the dock to provide a space to at least partially receive a tail-plate to be described. The dock plate 36 is also of suitable thickness so as ably to support relatively heavy loads moved thereover by loading trucks. Shield plates 42 are also positioned adjacent the inner edges of the flanges of the side beams 16 and extend upward therefrom to engage the upper flanges 24 of the facing plates 22, said shield plates extending rearward preferably to the cross-brace 26. The shield plates 42 are best illustrated in Figs. 3 and 4.

The loading ramp assembly or unit also includes a ramp plate 44 which extends between the shield plates 42 as clearly shown in Figs. 3 and 4. Said ramp plate has a forward end 46 which is bent at a slight angle to the plate, extending downward, as clearly shown in Figs. 1 through 3, said forward end being arranged to rest upon the rear end of a truck or the door sill of a vehicle being loaded, whereby the forward end of the ramp plate 44 is supported by the vehicle when in use.

Preferably heavy gauge sheet metal material is used to form the ramp plate, said material being similar to that used for the dock plate 36. Safety skirts 48 are fixed to the opposite side edges of the ramp plate 48 and depend therefrom as clearly shown in Figs. 1 through 3. These safety skirts 48 are adjacent and parallel to the shield plates 42 of the frame within which the ramp plate 44 operates, only a very slight space being provided therebetween to prevent binding. The safety skirts 48 are wedge shaped as shown in Fig. 2. In the preferred embodiment of construction, the ramp plate 44 is also provided on the under surface thereof with a plurality of parallel, spaced bracing webs 50 which are welded or otherwise secured thereto.

Flexibly connected to the rear end of the ramp plate 44 is a tail or spanning plate 52 which likewise is formed preferably from material similar to that from which the dock plate 36 and ramp plate 44 are formed. The flexible connection between the forward end of the tail-plate 52 and the rear end 44 of the ramp plate preferably comprises a piano-type hinge 54. This hinge is a heavy-duty type and may be formed, for example, by alternately welding sections of heavy tubing of equal length to the adjacent edges of the tail-plate 52 and the ramp plate 44. A continuous hinge pin is inserted therethrough.

The forward end of the tail-plate 52 is fixed by welding or otherwise to the top of a sliding cross-beam 56 which slides preferably upon the upper surfaces of the side beams 16 of the frame of the assembly. The tail plate 52 generally slidably overlies the dock plate 36 and, when the ramp plate 44 is extended forwardly, by means to be described, so that the forward end 46 of the ramp plate projects beyond the loading edge of the dock, the tail-plate 52 will span the space created between the rear end of the ramp plate 44 and the forward end of the dock plate 36 as best shown in Figs. 2 and 8. Under such circumstances, the tail-plate 52 automatically moves with the ramp plate 44 and the rear end 58 of the tail-plate 52 slides upon the upper surface of dock plate 36, said rear end 58 preferably being somewhat bevelled as shown.

As will be clearly seen from Figs. 1 through 3 and 8, the tail-plate 52 is arched or curved somewhat upwardly between its forward and rear edges, said arching or curving being slightly exaggerated in these figures so as better to illustrate the same. This arching or curving renders the tail-plate resistant to downward bending by loads in passing over the same but, even if momentarily deflected downward, the arched effect insures that the rear edge 58 will be in sliding engagement with the dock plate 36 so as to offer no obstruction to loading trucks when being wheeled over the arched tail-plate 52. It will thus be seen that the sliding beam 56 supports the forward end of tail-plate 52 and dock plate 36 supports the rear end of tail-plate 52. The rear end of ramp plate 44, being hingedly connected to the forward end of tail plate 52, also is supported by the tail-plate and the sliding beam 56.

In its normal position wherein the ramp plate 44 is flush with the floor surface of the dock 10 and the ramp plate is fully retracted into the recess 12, the sliding beam 56 is positioned adjacent the cross-beam 40 and the tail-plate 52 overlies the larger portion of the dock plate 36. The forward end 46 of the dock plate 44 will also be substantially even with the forward end of the frame of the assembly as shown in Fig. 5 as well as the loading edge of the dock.

When in said normal position, the ramp plate 44 is supported at its forward end by movable supporting members 60 which are best illustrated in Figs. 3 through 5, said members being projectable through openings 62 formed in the shield plates 42. The supporting members 60 abut the upper surfaces of side beams 16 for support thereby and operating rods 64 for actuating members 60 project upward from said members 60. Horizontally extending handles 66 are connected to the upper ends of the rods 64 and said handles are parallel to the supporting members 60, whereby said handles, in addition to being actuating means for the supporting members, are also indicating means for visually showing the position of the supporting members.

The handles 66 are positioned a reasonable distance above the flanges 24 through which the rods 64 rotatably extend. The handles are therefore readily available for manipulation at all times. The supporting members 60 engage opposite ends of a forward bracing beam 68 fixed to the under surface of and parallel to the forward end 46 of the ramp plate 44 as clearly shown in Fig. 4. Thus, a firm and rugged support is afforded the ramp plate 44 when in its normal position. Suitable notches 70 are formed in the safety skirts 48 adjacent their forward ends in order to permit engagement between the supporting members 60 and the ends of the bracing beams 68.

When it is desired to project the ramp plate 44 forwardly so as to extend it beyond the loading edge of the dock 10, or when it is desired to lower the forward end of the ramp plate below the level of the floor of the truck, it is necessary to pivotally retract the supporting members 60 into the openings 62 by manipulating the handles 66 and, to secure the supporting members 60 in retracted position, any suitable means such as resilient holding springs 72, shown in Figs. 5 through 7, are provided on the interior of facing plates 22. The holding springs 72 are provided with a detent engageable, for example, with a notch in the outer end of the supporting members 60 when the latter are moved to retracted position as illustrated in Fig. 7. In this position, the supporting members offer no obstruction to the movement of the ramp plate 44.

A relatively simple hydraulic system is provided for actuating the ramp and tail-plates 44 and 52, the units of said hydraulic system being best illustrated in Figs. 2, 4 and 5. Said units comprise a pair of hydraulic cylinders 74 and 76 and fluid is supplied thereto by a pump 78 actuated by a motor 80. Flexible conduits 82 and rigid tubes or pipes, not shown in their entirety, connect the opposite ends of the cylinders 74 and 76 with the pump 78, it being understood that these details are conventional in similar hydraulic systems.

The hydraulic cylinder 74 is provided with a piston rod 82 which is pivotally connected at its outer end to the bracing beam 68 adjacent the forward end of the ramp plate 44. The forward end of the ramp plate is thus movable in opposite vertical directions by the cylinder 74 and piston rod 82 when hydraulic pressure is supplied selectively to the ends of the cylinder, depending upon the direction in which the ramp plate is to be moved. The lower end of the cylinder 74 is pivotally secured to any suitable supporting means such as a cross-beam 84.

Hydraulic cylinder 76 is provided with a piston rod 86 which is connected at its outer end to sliding beam 56 as clearly shown in Figs. 2 and 8. The lower end of cylinder 76 is pivotally connected to cross-channel 32 of sub-frame 28 and when fluid pressure is selectively applied to opposite ends of the cylinder 76, the ramp plate 44 will be moved horizontally in opposite directions, carrying the tail-plate 52 therewith, depending upon which end of the cylinder is supplied with fluid pressure. The rearward end of the ramp plate 44 moves at all times substantially within the floor plane of the dock 10.

A suitable control station is provided in the form of a box or cabinet 88 supported by any suitable means such as a standard 90 secured to the dock 10. The box 88 is preferably positioned within convenient operating range and tubes or flexible conduits interconnect the box 88 with the cylinders 74 and 76. Control valves, not shown in detail, are positioned within the box and operating handles 92 actuate the valves. Also, a starting switch 94 preferably is mounted on the box for controlling conveniently the operation of the motor 80.

It will be understood of course that the operating handles 92 control valves interconnected to the respective tubes or conduits to the hydraulic cylinders so that all necessary and desirable operations of the ramp and tail-plates 44 and 52 are effected merely by manipulating one or more of the operating handles 92. By so manipulating the same, the forward end 46 of the ramp plate 44 may be disposed in a wide range of positions, both vertically and horizontally relative to the forward edge of the dock 10, thus accommodating the ramp plate and the entire assembly for use with a wide range of different heights of vehicles when positioned adjacent the dock. It is also to be understood that the box 88 and/or standard 90 may be positioned at any convenient location other than that illustrated in Fig. 1.

In operation, assuming that the ramp plate 44 is in its normal position within the floor plane of the dock 10 and is supported at its forward end by the supporting members 60 extending transversely beyond the shield plates 42, the necessary operating handles 92 are manipulated so as slightly to elevate the forward end of the ramp plate 44 and thus take the load thereof off of the supporting members 60. Handles 66 are then moved to the position thereof indicated in Figs. 1, 3 and 7 and the forward end of the ramp plate is then either elevated further or depressed below the level of the dock so that the forward end 46 thereof is slightly above the level of the floor, deck or door sill of a vehicle being moved up to the dock 10. When the vehicle is suitably positioned relative to the dock 10, the ramp plate 44 is either projected or retracted the necessary extent and the forward end 46 of the ramp plate is then lowered into engagement with the floor or door sill of the vehicle to be loaded so as to be supported directly by said vehicle. During any movement of the ramp plate 44 in a horizontal direction either forward or backward, the tail-plate 52 is moved automatically therewith in slidable relation relative to the dock plate 36, the tail-plate 52 bridging the space occurring between the ramp plate 44 and dock plate 36 as a result of positioning the ramp plate for use.

As the vehicle is loaded, it usually occurs that the vehicle gradually lowers due to the extra weight imposed thereon by the load, the springs of the vehicle yielding as a result of said load weight. Under these circumstances, the operating handles 92 are set during the loading operation of the vehicle so that the forward end of the ramp plate may float with the vehicle as it remains supported by said vehicle. Upon completion of the loading of the vehicle, the operating handles controlling the cylinder 72 are moved so as to elevate the forward end of the ramp plate and thus disengage it from the vehicle, the vehicle then being free to move from the dock. If no further loading is to be done at that time, the ramp plate 44 is preferably retracted to its normal position and the forward end is moved vertically to dispose the ramp plate within the floor surface of the dock, following which the handles 66 are moved to dispose the supporting members 60 in transverse position as shown in Fig. 4 and the power to the hydraulic cylinders is then shut off by the handles 92, the motor also being stopped by the switch 94. Under these conditions, the various plates of the loading ramp unit are all supported by portions of the frame of the unit or assembly and members 60, the hydraulic cylinders preferably forming no part of such supporting structure. Said various plates are then also disposed substantially within the floor plane of the dock and, in effect, comprise a part of it so that warehouse or hand trucks, for example, may be moved over said plates which are thus firmly supported and readily capable of sustaining such trucking loads.

While, in the preferred embodiment thereof, the present invention utilizes a dock plate 38 for slidably supporting the rear end of tail-plate 52 and the side beams 16 are long enough to support said dock plate, it is to be understood that the dock plate may be eliminated, if desired, and the rear end of the tail-plate could then be supported slidably and directly by the floor surface of the dock or within a shallow, flat depression formed in said floor surface to receive said tail-plate and permit the upper surface of the tail-plate to be substantially flush with said floor surface of the dock. Under such circumstances, the side beams 16 could then be shortened. The overall material and construction cost of the entire unit would also proportionately be reduced by the foregoing changes in construction.

From the foregoing, it will be seen that a rugged, heavy-duty loading ramp unit is provided which is capable of readily being installed in a dock and operated by means requiring a relatively low consumption of power since the power means are only used to position the ramp plate 44 of the unit relative to a vehicle and correspondingly move tail-plate 52 and said power means preferably are not required to support the ramp plate or any of the other plates of the unit during loading operations. Only the manipulation of valve handles and switch buttons are required to effect proper positioning of the ramp and tail-plates for loading operations and the operators loading the vehicle or manipulating the ramp plate are protected against accident inasmuch as the safety skirts 48 prevent an operator from placing any part of his body under the ramp plate 44 during the movement of said plate while above the floor surface of the dock. Similarly, the shield plates 42 which are mounted stationarily relative to the dock 10, prevent an operator from placing any part of his body in such a way that it can be harmed while the ramp plate 44 is depressed at its forward edge below the floor surface of the dock 10. Further, the supporting members 60 are readily manipulated manually by the handles 66 and require very little effort to do so. Also, as shown in Fig. 2, the forward projecting movement of the ramp plate 44 is stopped by engagement of the ends of the sliding beam 56 against the rear ends of shield plates 42 which are fixed to the side beams 16 by welding or otherwise. Similarly, the rearward retracting movement of the ramp plate 44 is stopped by the engagement of sliding beam 56 with stationary cross-beam 40.

While the invention has been shown in its preferred embodiment, and has included certain details, it should be understood that the invention is not to be limited to the precise details herein illustrated and described since the same may be carried out in other ways falling within the scope of the invention as claimed.

I claim:

1. A loading ramp assembly for a dock comprising in combination, a frame arranged to be fixed relative to a dock and including horizontally spaced beams positionable substantially parallel with the floor plane of said dock, supporting means extending transversely to said spaced beams and spanning the same for slidable support thereby and the uppermost portion of said supporting means being substantially flush with the floor plane of said dock when so supported by said beams, a tail-plate connected at its forward edge to said supporting means, a member fixed relative to said frame means and positioned rearwardly of said supporting means and arranged to slidably support the rear edge of said tail-plate substantially within the floor plane of said dock, a ramp plate pivotally connected at its rear edge to said forward edge of said tail-plate, and an actuating mechanism interconnected to said supporting means and said ramp plate and operable to move the supporting means, ramp plate, and tail-plate forwardly and backwardly relative to the forward edge of a dock and another actuating mechanism also operable to move the forward edge of said ramp plate vertically relative to a vehicle when adjacent said dock edge to effect engagement between said vehicle and forward edge of said ramp plate, said tail-plate being movable substantially within the floor plane of said dock and bridging the space between said supporting means and said member.

2. The loading ramp assembly of claim 1 further characterized by said supporting means comprising a cross-beam and the ends thereof slidably engaging said spaced beams of said frame, thereby supporting the connected edges of said plates.

3. The loading ramp assembly of claim 1 further characterized by said member comprising a plate, and cross-beams fixed to said frame and positioned to support said plate from beneath substantially within the floor plane of said dock.

4. The loading ramp assembly of claim 1 further including supporting members movably supported by said frame adjacent opposite sides of said ramp plate, said supporting members being movable to and from projected positions toward each other and, when so projected toward each other being positioned to engage and support opposite sides of the outer end of said ramp plate when the latter is positioned flush with said floor plane of said dock.

5. The loading ramp assembly of claim 4 further including a bracing beam connected to and extending transversely across and beneath said ramp plate adjacent the outer end thereof and the outer ends of said bracing beam being arranged to engage said supporting members when projected toward each other to support the outer end of said ramp plate when positioned flush with said floor plane of said dock.

6. The loading ramp assembly of claim 4 additionally including handles fixed to said supporting members which support the outer end of said ramp plate when arranged to project toward each other, said handles being positioned above the floor plane of said dock and extending substantially horizontally and serving to actuate said supporting members and also being co-ordinated with said supporting members in a manner to indicate the positions of said supporting members relative to said frame so as visually to enable an operator to determine whether said supporting members are disposed in projected supporting position or retracted into an inoperative position.

ROBERT C. RAMER.

References Cited in the file of this patent

UNITED STATES PATENTS

| Number | Name | Date |
|---|---|---|
| 1,119,784 | Axe | Dec. 1, 1914 |
| 1,210,133 | Baker | Dec. 26, 1916 |
| 1,698,209 | Barlow | Jan. 8, 1929 |
| 2,547,460 | Hamilton, Jr. | Apr. 3, 1951 |

FOREIGN PATENTS

| Number | Country | Date |
|---|---|---|
| 614,466 | Germany | of 1935 |

OTHER REFERENCES

"Freight Handling"—Productivity Team Report by Anglo-American Council on Productivity, published July 1951 on conditions existing in June and July of 1950, pages 27 and 28 relied upon.